July 3, 1945. W. T. HALL 2,379,519
DISTILLATION HEAT EXCHANGE METHOD AND APPARATUS
Filed Dec. 7, 1943 2 Sheets-Sheet 1
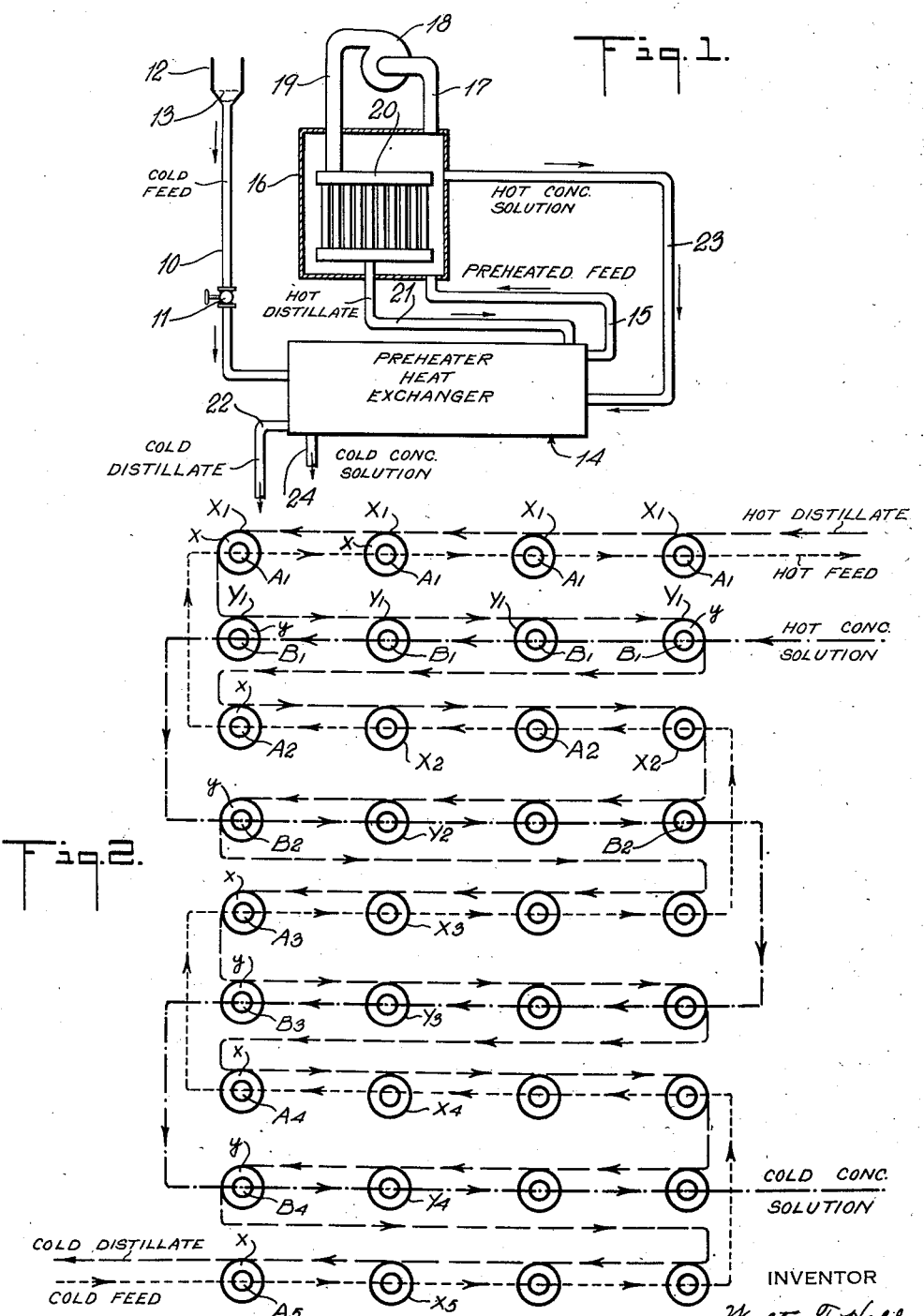
INVENTOR
Walter T. Hall
BY Kenyon & Kenyon
ATTORNEYS July 3, 1945.  W. T. HALL  2,379,519
DISTILLATION HEAT EXCHANGE METHOD AND APPARATUS
Filed Dec. 7, 1943  2 Sheets-Sheet 2
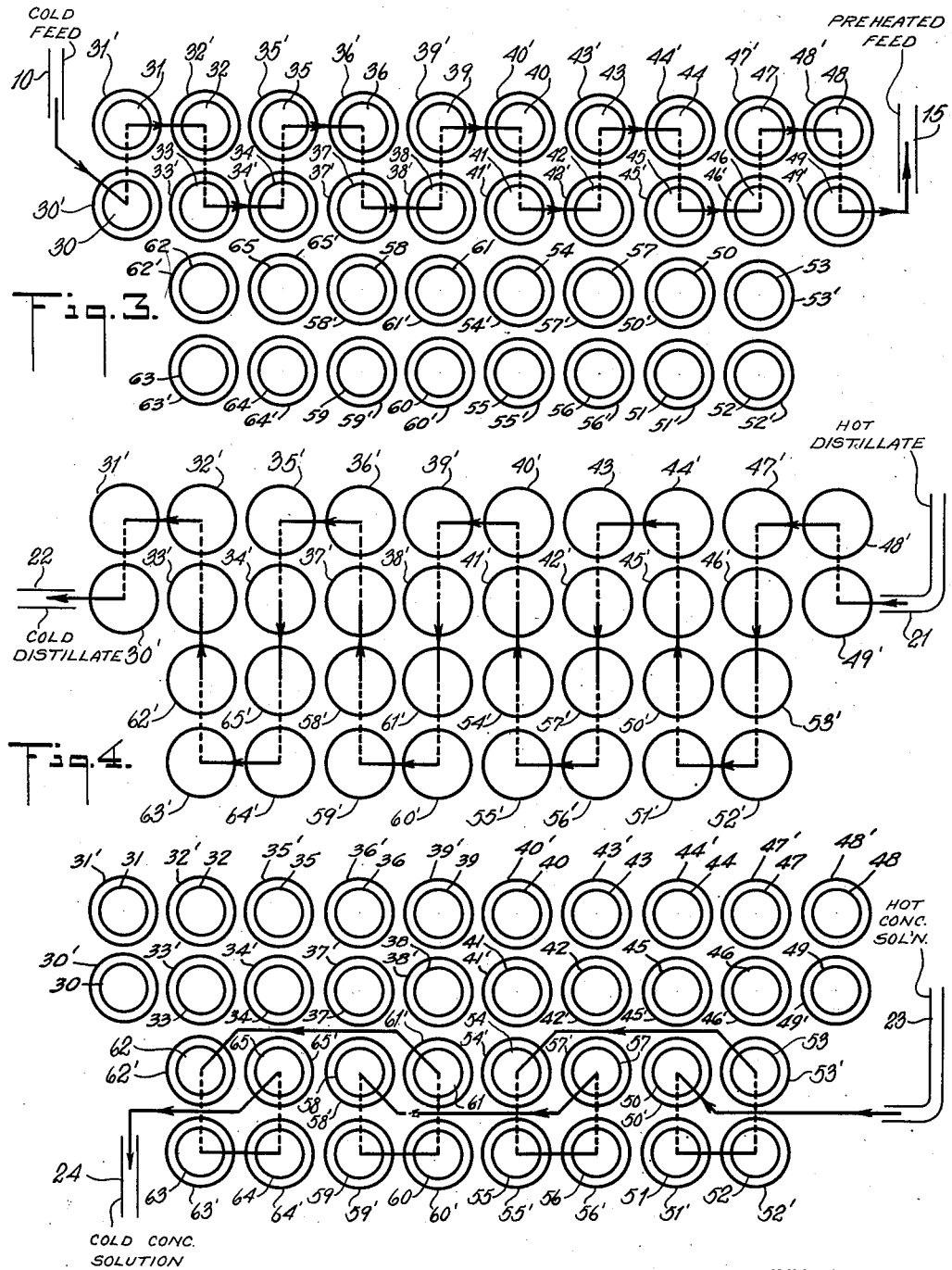

Patented July 3, 1945

2,379,519

UNITED STATES PATENT OFFICE 2,379,519

DISTILLATION HEAT EXCHANGE METHOD AND APPARATUS

Walter T. Hall, Winchester, Mass., assignor to Arthur D. Little, Inc., Cambridge, Mass., a corporation of Massachusetts Application December 7, 1943, Serial No. 513,318

11 Claims. (Cl. 202—61)

This invention relates to distillation method and apparatus. By distillation, reference is made to any operation which is characterized by evaporation of a portion of a solution. Such operations sometimes are referred to by such terms as evaporation, condensation, fractionation, rectification, etc. The process of distillation is applicable to any solution containing two or more substances which can be separated by reason of their differences in boiling point or volatility. The solution subjected to distillation may be any more or less concentrated solution of a solid, liquid or gas in a liquid or liquid mixture. During the distillation the solution occurs in a liquid state although under other conditions of temperature and pressure the solution may exist in some other state, e. g., solid, gas or vapor. This invention is applicable particularly to a distillation operation wherein a solution to be distilled is fed into a vaporization zone in which a portion of the solution evolved as vapor that is condensed and taken off as distillate, the concentrated solution being withdrawn from the vaporization zone as an effluent. In such an operation the incoming feed has heretofore been preheated by out-of-contact heat exchange with effluent distillate and by out-of contact heat exchange with effluent concentrated solution withdrawn from the vaporization zone.

It is an object of this invention to provide improved method and apparatus for preheating the incoming feed in a distillation operation of the character aforesaid by heat exchange with effluent distillate and by heat exchange with effluent concentrated solution withdrawn from the vaporization zone.

It is a further object of this invention to provide for use in distillation operations of the character aforesaid, simple preheating means which can be readily cleaned and reconditioned with a minimum of dismantling.

It is a further purpose of this invention to provide a method of providing efficient and controlled heat exchange in the preheating of incoming feed by heat transference from effluent distillate and from effluent hot concentrated solution.

It is a feature of this invention that the incoming feed is brought into heat exchange relation with the distillate in a plurality of sequentially arranged zones, and that between said zones additional zones are provided wherein the distillate is reheated by heat exchange with the concentrated solution withdrawn from the vaporization zone. It is a further feature of this invention that the liquids carrying dissolved material therein, namely, the incoming feed and effluent concentrated solution, are carried in tubes or other conduits or passage means which are jacketed, the distillate being flowed through the jackets in out-of-contact and preferably counter-flow heat exchange relation with the liquids within the conduits, and the distillate being directed for alternate heat exchange with incoming solution and with effluent concentrated solution.

It is one of the advantages of the novel heat exchange device of this invention that the preheater portion of the distillation unit can be arranged so that the liquids carrying dissolved material, namely, the incoming feed and the effluent concentrated solution are directed through tubes or other conduits or passage means the interior of which can be readily cleaned. Liquid that contains dissolved substances, in passing through conduits in out-of-contact heat exchange with other fluids, tend to form deposits which cut down the capacity of the heat exchange unit and lower its efficiency so that occasional cleaning and reconditioning are required. Such difficulties are especially pronounced in handling the concentrated solution that is withdrawn from the vaporization zone. Such cleaning and reconditioning have heretofore been troublesome in the case of heat exchange units wherein heat exchange is to be provided between one fluid and two other fluids. According to this invention, an efficient heat exchanger is provided that can be readily cleaned and reconditioned with a minimum of dismantling.

It is a further advantage of this invention that desirable control can be had of the heat transference between the incoming feed and the effluent distillate and the effluent concentrated solution respectively, so that the temperature differential in the system can be maintained as desired.

Further purposes, features and advantages of this invention will be apparent in connection with the following description of illustrative embodiments of this invention shown in the accompanying drawings, wherein:

Fig. 1 is a front elevation, largely diagrammatic, of one type of distillation unit which includes the new preheater heat exchange means of this invention;

Fig. 2 is a schematic flow sheet showing the paths of the different liquids in effecting heat transference according to this invention.

Fig. 3 is a front elevation, largely diagrammatic, of a battery of pairs of concentric tubes constituting a preheater heat exchanger constructed according to this invention, the line connections for the feed solution, only, being shown, the feed solution flowing through the inner tube of each of the pairs of tubes on the indicated line of travel of the incoming feed;

Fig. 4 is a front elevation of the battery of tubes shown in Fig. 3 with the inner tube of each pair of tubes omitted for the purpose of clarity, the line connections for the effluent distillate, only, being shown, the effluent distillate flowing through an annular space between the inner and outer tube of each pair of tubes in out-of-contact heat exchange relation with fluid in the interior of the inner tube and Fig. 5 is a front elevation of the battery of pairs of concentric tubes shown in Fig. 3, the line connections for the effluent concentrated solution, only, being shown, the effluent concentrated solution flowing through the inner tube of each of the pairs of tubes on the indicated line of travel of the effluent concentrated solution.

Referring to the drawings, in Fig. 1 there is shown a distillation unit including the new preheater heat exchanger of this invention. Merely for purposes of illustration, the distillation unit has been shown as one operating on the vapor compression principle. The cold feed of solution is fed into the system by line 10, the rate of feed being controlled by the valve 11. The feed is taken from the container 12 and may pass through a strainer 13 or the like to remove solid particles. The feed can be fed in by gravity or by a pump or by any other suitable means. The feed passes through the preheater heat exchanger which is indicated generally by the reference character 14, the details of which will be described hereinbelow. After having been preheated in the heat exchanger 14 the feed, which has now been preheated, is fed by line 15 into the evaporization chamber 16.

Vapor evolved in the vaporization chamber 16 is directed by line 17 to the compressor 18 which is supplied with power by any suitable means (not shown) and which compresses the vapor until its condensing temperature is above the boiling point of the solution in the vaporization chamber 16. The compressed vapor is directed by line 19 to the condenser heat exchanger 20 within the vaporization chamber 16. In the condenser heat exchanger 20 the compressed vapor is brought into out-of-contact heat exchange relation with the solution in the vaporization chamber 16 and condenses to form distillate which is withdrawn by line 21 which directs the effluent distillate to the preheater heat exchanger 14. In condensing within the condenser heat exchanger 20, the compressed vapor gives up its latent heat, and the latent heat, plus certain additional heat supplied to the vapor by the action of the compressor, affords sufficient heat to maintain vaporization of solution in the vaporization chamber. In such a unit of the vapor compression type prevention of heat losses to the atmosphere can be minimized by providing suitable heat insulation (not shown) about any parts of the unit which operate at superatmospheric temperature. The cold distillate is taken from the preheater heat exchanger 14 by the line 22.

Within the vaporization chamber 16, the solution becomes concentrated as a result of removal of a volatile component therefrom and the effluent concentrated solution is directed therefrom by line 23 to the preheater heat exchanger 14. The cold concentrated solution is taken from the preheater heat exchanger 14 by the line 24.

It is to be understood that the distillation unit shown in Fig. 1 and described above is merely illustrative and that other types of distillation units may be employed. Thus the distillation may not be of the vapor-compression type but may be carried out using some outside source of heat such as combustion gases, steam, electricity, or the like. In such case the compressor 18 can be omitted and the vapor evolved from the boiling solution can be condensed in other ways, as by heat exchange with some outside fluid such as water, air, or the like. More generally, in connection with the practice of this invention, the distillation may be of any type wherein feed solution is fed into an evaporator for distillation therein, evolved vapor is condensed in a condenser to form a stream of effluent distillate and concentrated solution is removed from the evaporator to form a stream of effluent concentrated solution. In any such distillation the feed of fresh solution to the evaporator can be preheated by out-of-contact heat exchange with the effluent distillate and by out-of-contact heat exchange with the effluent concentrated solution utilizing the method and apparatus of this invention.

A typical system of flow in preheating incoming feed by heat transfer with respect to hot distillate and hot concentrated solution according to this invention, is represented by the flow sheet shown in Fig. 2. The incoming feed flows within the conduits A1, A2, A3, A4 and A5. The hot concentrated solution flows within the conduits B1, B2, B3, and B4. About the conduits A1, A2, A3, A4 and A5 are jackets X1, X2, X3, X4 and X5 and the distillate flows within the passages $x$ between these conduits and the surrounding jackets. About conduits B1, B2, B3, and B4 are jackets Y1, Y2, Y3, and Y4 and the distillate flows within the passages $y$ between these conduits and these jackets.

Starting at the top of the flow sheet of Fig. 2, the hot distillate is directed through the passages $x$ in out-of-contact heat exchange relation with the hot feed flowing toward the vaporization chamber in the group of conduits A1. The hot distillate when brought to the preheater is at substantially the temperature at which it is discharged from the condenser, and the feed, when discharged from the preheater after heat exchange with the entering distillate, will have been brought to the maximum temperature which it attains in the preheater. In moving from right to left within the jackets X1 while the feed is moving from left to right within the group of conduits A1, the distillate gives up heat to the feed. After leaving the jackets X1, the distillate is next directed through the jackets Y1 in out-of-contact heat exchange relation with the concentrated solution in the group of conduits B1. The hot concentrated solution when brought to the preheater is substantially at the temperature of the boiling solution in the vaporization chamber and, being at a temperature above the temperature of the distillate after the distillate has given up a portion of its heat to the incoming feed, serves to reheat the distillate as the distillate moves from left to right about the group of conduits B1. The distillate which has not been reheated by heat transferred from the effluent concentrated solution is again brought into heat exchange with the incoming feed in the group of conduits A2 by means of the jackets X2 and gives up heat to the feed as the distillate moves from left to right through this group of jackets X2. This distillate is thereafter reheated by directing it through the jackets Y2 in out-of-contact heat exchange relation with the concentrated solution in the group of conduits B2. A similar sequence of heat transfer operations occurs in the lower groups of conduits, the feed passing through the groups of conduits A3, A4, and A5 and the concentrated solution passing through the groups of conduits B3 and B4 in the direction indicated by the flow sheet relative to the direction of the effluent distillate. The distillate flows down through the additional jackets of groups X3, Y3, X4, Y4, and X5. Eventually the desired amount of heat is transferred to the feed from the distillate and from the concentrated solution and these streams are discharged from the preheater heat exchanger. It is seen that the effluent distillate is successively brought into out-of-contact heat exchange relation with the incoming feed and with the hot concentrated solution in such a way that the effluent distillate alternately gives up heat to the incoming feed and receives heat from the effluent concentrated solution and that the distillate acts as a transfer medium for transferring heat from the effluent concentrated solution to the incoming feed.

A typical preheater heat exchanger of this invention is shown somewhat more concretely in Figs. 3, 4 and 5. The preheater consists of a battery of tubes which are viewed endwise. The battery consists of two banks of tubes, one bank of tubes being the tubes 30 to 49 inclusive, and the other bank of tubes being the bank of tubes 50 to 65 inclusive. Spaced from each of the tubes are jacket tubes 30' to 65' inclusive. The tubes and jackets can be maintained in assembled position by any suitable means (not shown).

Considering that the tube battery shown in Figs. 3, 4 and 5 constitutes the preheater heat exchanger 14 of the distillation unit shown in Fig. 1, the feed of cold solution as shown in Fig. 3 enters the preheater heat exchanger from line 10 and flows successively through tubes 30 to 49 inclusive of the upper bank of tubes. The line connections between the tubes which are at the near end of the tube battery are indicated by solid lines while the line connections on the remote end of the tube battery are indicated in dotted lines. These line connections may be in the form of pipes or tubes or may be in the form of passages in suitable header means as may be desired. It is seen that the incoming feed enters the tube 30 at the near end of the tube and passes through it to the remote end where it is directed to the remote end of tube 31. The feed flows through tube 31, from the remote end to the near end and is then directed to the near end of tube 32 through which it flows to the remote end of tube 32. This system of flow is continued until the feed is discharged from the near end of tube 49 from where it is taken in a preheated condition to vaporization chamber 16 by line 15.

Referring particularly to Fig. 5, the concentrated solution from the vaporization chamber 16 is directed by line 23 through tubes 50 to 65 which constitute the lower bank of tubes. The line connections on the near end of the battery are indicated in solid lines and the line connections at the remote end are indicated in dotted lines. The concentrated solution enters the near end of tube 50. It flows to the remote end of tube 50 and is directed to the remote end of tube 51. Then it flows to the near end of tube 51 and from there to tube 52 for flow to the remote or far end of the battery. This system of flow is repeated until the concentrated solution is taken from the near end of tube 65 and out of the preheater heat exchanger by line 23.

The hot distillate flowing from the condenser 20 by line 21 flows through spaces provided between the tubes 30 to 65 and the jacket tubes 30' to 65'. The path followed by the distillate is shown in Fig. 4 wherein, for purposes of clarity, only the jacket tubes 30' to 65' are shown. As before, the line connections for the jacket tubes are indicated in solid lines at the near end and in dotted lines at the remote end of the battery. The hot distillate is directed into the near end of jacket 49' and flows therethrough to the remote end where it is taken to the remote end of jacket 48' for flow to the near end. This system of flow is followed through the group of jackets 49', 48', 47' and 46', successively. It may be noted that the distillate flows through these jackets in counter-flow with the feed. Thus, while the feed is flowing from the remote to the near end of the tube 49, the distillate is caused to flow from the near to the remote end of jacket 49'. Similarly, in tube 48, the feed flows from the near to the remote end while the distillate flows in jacket 48' from the remote to the near end.

After the distillate has flowed in out-of-contact heat exchange relation with the feed in the group of tubes 46 to 49, the distillate is then caused to flow in out-of-contact heat exchange relation with the hot concentrated solution in the group of tubes 50 to 53. The distillate flows from the near end to the remote end of jacket 53 in counter-flow with the hot concentrated solution flowing from the remote end to the near end of tube 53. Similarly counter-flow is maintained between the distillate in jackets 50' to 52' with respect to the hot concentrated solution in tubes 50 to 52. Since the hot concentrated solution enters the near end of tube 50, the distillate emerging from the near end of jacket 50' will be heated to its maximum temperature by heat derived from the hot concentrated solution before the distillate is returned to heat exchange relation with the feed in the group of tubes 42, 43, 44 and 45.

The progress of the distillate with reference to the incoming feed in one bank of tubes and with reference to hot concentrated solution in the other bank of tubes follows the pattern above described and as indicated by the arrows in Figs. 3, 4 and 5 until the distillate, now deprived of most of its heat, is discharged from the near end of jacket 40' and thence from the preheater heat exchanger by line 22.

In assembling the preheater heat exchanger, the battery of tubes and jackets or the equivalent is preferably enclosed in a suitable enclosure such as a box or casing and the spaces between the jackets and between the jackets and the box are filled with mineral wool, glass wool, or other suitable heat insulating material.

By the employment of a heat exchanger such as that shown herein, any disassembling required for cleaning and reconditioning the preheater heat exchanger is reduced to a minimum, since it is not necessary to disassemble the tubes 30 to 65 with respect to the jackets 30' to 65'. It is to be noted that the distillate, which does not contain material tending to foul the passages through which it is directed, occupies the jackets. All that is necessary, therefore, is to uncover the ends of the tubes 30 to 65 and clean the interior of these tubes. When the line connections between the tubes and jackets of the battery are provided by headers, the only disassembly required is removal of the headers.

It is another advantage of the preheater heat exchanger of this invention that by bringing the distillate into heat exchange relation with the hot concentrated solution in separate heat exchange zones for reheating the distillate, one can control the point at which the heat from the hot concentrated solution is introduced for ultimate transference to the incoming feed much more accurately than is the case with ordinary heat exchange devices and can make adjustments as to the point or points where the heat from the hot concentrated solution is introduced relatively to the heat supplied by the distillate to the feed. In this manner, desired temperature gradients can be better maintained throughout the heat exchange operation.

In the preheater heat exchanger shown in Figs. 3, 4 and 5, the distillate is maintained in counter-flow relation with the feed in the tubes. Considering the system as a whole the feed and the distillate are directed for over-all reverse heat transference, namely, the distillate is directed so that it enters hot in the heat exchange zone where the feed leaves and leaves cold in the heat exchange zone where the feed enters. The distillate is also maintained in counter-flow with hot concentrated solution in the individual tubes, but, considering the system as a whole, the distillate and concentrated solution are directed for over-all in-line heat transference, namely, the distillate is directed so that it enters hot in the heat exchange zone where the hot concentrated solution also enters, and leaves cold in the heat exchange zone where the cold concentrated solution also leaves.

While the maintenance of counter-flow throughout the system between the distillate and the feed or concentrated solution or both is distinctly preferable, such counter-flow is not essential. Moreover, other modifications can be made without departing from the scope of this invention. In the specific preheater heat exchanger shown, the distillate flows through jackets about each tube of a group of four tubes in one bank, then through the jackets of each tube of a group of four tubes in the other bank and so on. It is apparent, however, that the number of jackets for a group of tubes in one bank through which distillate is directed before it enters jackets of a group of tubes in the other bank, may vary from one to any greater number, although it is usually preferable to direct the distillate through the jackets surrounding a plurality of tubes constituting a group in one bank before the distillate is passed to the jackets of the group of tubes in the other bank. It is also apparent that the arrangement of the tubes in the different banks of tubes and in the battery as a whole may be varied as well as the arrangement of line connections between the tubes. Moreover, instead of tubes, other conduits or passage means may be employed which may or may not be tubular, and the jackets do not necessarily have to completely surround the inner conduits or passage means. Moreover, other variations in the exemplary embodiments shown and described herein may be made without departing from the scope of this invention. Accordingly, the scope of this invention is to be governed by the language of the following claims construed in the light of the foregoing description of this invention.

I claim

1. The combination with distillation apparatus including a vaporization chamber, feed means for introducing fresh solution to be distilled into said vaporization chamber, condenser means arranged to condense as distillate vapor evolved from solution in said chamber, means for directing effluent distillate from said condenser means, and means for withdrawing effluent concentrated solution from said vaporization chamber, of preheating means for preheating fresh solution fed into said vaporization chamber by said feed means, said preheating means comprising means for directing said effluent distillate from said condenser means in out-of-contact heat exchange relation with incoming feed solution in a plurality of first zones of heat exchange between said incoming feed solution and said effluent distillate, and means for directing effluent concentrated solution withdrawn from the vaporization chamber in out-of-contact heat exchange relation with said effluent distillate in a plurality of second zones of heat exchange between said distillate and said concentrated solution, said first and second zones being arranged in series relation for directing said effluent distillate successively in out-of-contact heat exchange relation with said incoming feed solution and in out-of-contact heat exchange relation with said effluent concentrated solution.

2. The combination with distillation apparatus including a vaporization chamber, feed means for introducing fresh solution to be distilled into said vaporization chamber, condenser means arranged to condense as distillate vapor evolved from solution in said vaporization chamber, means for directing effluent distillate from said condenser means, and means for withdrawing effluent hot concentrated solution from said vaporization chamber, of preheating means for preheating fresh solution fed into said vaporization chamber by said feed means, said preheating means comprising means for directing said effluent distillate from said condenser means in out-of-contact heat exchange relation with said incoming feed in a plurality of sequentially arranged zones of heat exchange between said effluent distillate and said fresh solution in said feed means and means for directing said effluent hot concentrated solution into out-of-contact heat exchange relation with said effluent distillate between said zones wherein said distillate is directed in out-of-contact heat exchange relation with the fresh solution in said feed means.

3. In distillation apparatus including a vaporization chamber, feed means for introducing fresh solution to be distilled into said vaporization chamber, condenser means arranged to condense as distillate vapor evolved from said vaporization chamber, means for directing effluent distillate from said condenser means and means for directing effluent concentrated solution from said vaporization chamber, preheating means for preheating fresh solution fed into said vaporization chamber by said feed means, said preheating means comprising means for directing said effluent distillate in out-of-contact heat exchange relation with incoming feed for over-all reverse heat-transference between said effluent distillate and said incoming feed, and means for directing said distillate at a plurality of intermediate points in said over-all heat transference between said effluent distillate and said incoming feed into a plurality of zones of out-of-contact heat exchange relation between said effluent concentrated solution and said distillate, said zones being arranged for over-all in-line heat transference between said effluent distillate and said effluent concentrated solution.

4. In distillation apparatus according to claim 3, said means for directing said effluent distillate and said effluent concentrated solution in out-of-contact heat exchange relation in a plurality of zones being arranged so that in said zones said effluent distillate is directed in counter-flow out-of-contact heat exchange relation with said effluent concentrated solution.

5. In distillation apparatus according to claim 3, said preheating means being arranged for counter-flow out-of-contact heat exchange between said effluent distillate and said incoming feed and for counter-flow out-of-contact heat exchange between said effluent distillate and said effluent concentrated solution essentially throughout said preheater means.

6. In distillation apparatus according to claim 3, said preheater means being constructed for directing said effluent distillate through jacket means on the outside of first passage means through which incoming feed is directed in out-of-contact heat exchange relation with said distillate in said jacket means and alternately through jacket means on the outside of second passage means through which effluent concentrated solution is directed in said zones in out-of-contact heat exchange relation with effluent distillate in said jacket means that are on the outside of said second passage means.

7. In distillation apparatus including a vaporization chamber, condenser means arranged to condense as distillate vapor evolved from solution in said vaporization chamber, means for directing effluent distillate from said condenser means, feed means for directing incoming feed of fresh solution into said vaporization chamber for distillation therein, and means for withdrawing effluent concentrated solution from said vaporization chamber, preheater heat exchange means for preheating fresh solution fed into said vaporization chamber by said feed means, said preheater heat exchange means comprising a plurality of conduits having jackets thereabout, means for directing incoming feed through some of said conduits, means for directing effluent concentrated solution withdrawn from said vaporization chamber through other of said conduits, and means for directing effluent distillate from said condenser means through the jackets about said conduits for alternate out-of-contact heat exchange with said incoming feed and with said effluent concentrated solution.

8. In distillation apparatus including a vaporization chamber, condenser means arranged to condense as distillate vapor evolved in said vaporization chamber, means for directing effluent distillate from said condenser means, feed means for directing incoming feed of fresh solution into said distillation chamber for distillation therein, and means for withdrawing effluent hot concentrated solution from said vaporization chamber, preheater heat exchange means for preheating fresh solution fed into said vaporization chamber by said feed means, said preheater heat exchange means comprising a battery of tubes, individual jackets about said tubes, means for directing incoming feed sequentially through the tubes of a first bank of said tubes of said battery, means for directing concentrated solution withdrawn from said vaporization chamber sequentially through the tubes of a second bank of said tubes of said battery, and means for directing effluent distillate from said condenser means through said jacket means about said tubes of said first and of said second banks of said battery of tubes in counter-flow out-of-contact heat exchange relation with incoming feed in the tubes of said first bank and in counter-flow out-of-contact heat exchange relation with hot concentrated solution in the tubes of said second bank, said means for directing said distillate being arranged to direct said distillate alternately in heat exchange relation with fresh solution contained in sub-groups of said first bank of tubes and with concentrated solution contained in sub-groups of said second bank of tubes for over-all reverse heat transference with the incoming feed in said first bank of tubes and for over-all in-line heat transference with concentrated solution in said second bank of tubes.

9. Apparatus according to claim 8 wherein said sub-groups of said first and second banks of tubes comprise a plurality of tubes.

10. A method of distillation which comprises causing vapor to be evolved from solution in a vaporization zone, condensing vapor evolved from solution in the vaporization zone to form an effluent distillate, feeding fresh solution to be distilled into said vaporization zone, withdrawing hot concentrated solution from said vaporization zone, and directing the effluent distillate for successive out-of-contact heat exchange with said incoming feed and with said effluent hot concentrated solution, said effluent distillate being directed for alternately giving up heat to said incoming feed and receiving heat from said effluent hot concentrated solution.

11. A method of distillation according to claim 10 wherein said effluent distillate, in being directed for giving up heat to said incoming feed, is directed in counterflow heat exchange with the incoming feed during a plurality of individual intervals which are alternate with respect to intervals during which the effluent distillate receives heat from the effluent hot concentrated solution and is directed for over-all reverse heat transference with respect to the incoming feed, and wherein said effluent distillate, in being directed for receiving heat from the effluent hot concentrated solution, is directed in counterflow heat exchange with the hot concentrated solution during a plurality of individual intervals which are alternate with respect to the intervals during which the effluent distillate gives up heat to the incoming feed and is directed for over-all in-line heat transference with respect to the effluent hot concentrated solution.

WALTER T. HALL.